Patented Aug. 30, 1938

2,128,604

UNITED STATES PATENT OFFICE 2,128,604

MANUFACTURE OF ARTIFICIAL SILK

Robert F. Davis, Arlington Ridge, Va., assignor to American Enka Corporation, Enka, N. C., a corporation of Delaware No Drawing. Application April 22, 1937,
Serial No. 138,473

6 Claims. (Cl. 28—1)

The present invention relates to the manufacture of artificial silk and more particularly involves the production of threads, filaments and the like having a high covering power and a very low or diminished luster.

It is well known in the rayon industry today to manufacture so-called "delustered" artificial silk. Such delustered artificial silk is prepared by incorporating in a cellulosic solution various materials having the desirable index of refraction or a light refractive index different from that of the cellulose solution or the cellulosic product formed therefrom. The degree of opacity or low-luster effect is usually dependent upon the amount of material employed and its refractive index. For this reason there are a limited number of delustering materials that can be used with commercial success because most of the known low-luster inducing agents, which otherwise have suitable chemical and physical properties, have indices of refraction so nearly the same as the cellulosic solution per se that prohibitive amounts are necessary in order to provide sufficient opacity in the finished thread. If the employment of high percentages of a delustering agent is necessary, then the strength and continuity of the thread is materially impaired.

At present, a large proportion of the low-luster artificial silk on the market is manufactured from cellulose solutions having incorporated therein either an inorganic pigment or an organic compound of the type pine oil, kerosene, or other oils. In some cases a combination of an oil and inorganic pigment is used. Furthermore, it has been determined that threads can be produced having a very low luster closely resembling that possessed by natural silk by adding a volatile oil with or without a pigment to the spinning solution and upon the extrusion of the solution to form filaments and the subsequent processing steps, at least a portion of the volatile oil is removed leaving pores or pitted places on the surface of the yarn.

As previously pointed out, very few materials and especially the inorganic pigments can be employed with any degree of success owing to the nature of most of the pigments, which do not have either sufficient covering power or the proper index of refraction. In fact, prior to my invention, probably the most satisfactory inorganic pigment which has been used for imparting a low luster to artificial silk filaments is titanium dioxide. This pigment has an index of refraction sufficiently different from threads of cellulosic origin and at the same time has a high covering power so that small amounts of the same can be used in the production of threads without impairing the strength thereof.

My present invention relates to the use of an inorganic pigment which has hitherto been unknown in the rayon industry. This pigment is a metallic nitride such as, for example, an earth metal nitride, and specifically boron nitride. Boron nitride has a high covering power and an index of refraction of approximately 1.62 which is sufficiently different from cellulose to impart, when incorporated in a cellulosic solution in small amounts, a very low luster to the resulting filaments making up the thread. In addition to the foregoing favorable properties, boron nitride is a white, infusible crystalline powder extremely light in weight and is insoluble in solutions of acids or alkalies. These properties render this material peculiarly adaptable for use as a delustering agent.

Boron nitride is considerably lighter in weight than titanium dioxide and having a suitable index of refraction is even more desirable than titanium dioxide because the lightness in weight renders it more easily and uniformly dispersable in the cellulosic solution.

Whereas, it is contemplated that low-luster artificial silk filaments can be manufactured by using boron nitride in conjunction with any of the known processes such as the viscose, cuprammonium, acetate or the nitrocellulose process, my detailed description will be exemplified by the viscose process. In the preparation of the viscose solution for spinning, cellulose is treated with an alkali solution to form alkali cellulose which is allowed to ripen or age. The alkali cellulose is then subjected to the action of carbon disulphide to form cellulose xanthate. The next step in the process is to form the viscose solution by dissolving the xanthate in dilute sodium hydroxide. It is during this dissolving period that the boron nitride is preferably added, although my invention contemplates adding the pigment at any stage during the manufacture of the viscose solution prior to extrusion. In order to effect a uniform dispersion of the pigment throughout the viscose solution, it is usually desirable to preliminarily mix up a batch of boron nitride in a weak caustic solution, whereafter this mixture is finely ground in a ball mill or the like and added to a small portion of the viscose solution per se. This method has been found to give an excellent uniform distribution of the pigment particles. The small portion of the viscose solution containing the pigment particles is finally introduced into the bulk of the viscose solution. The solution is then extruded or spun in the usual manner to form threads.

By way of example, I have found that a very low-luster yarn can be provided by utilizing small proportions of pigment from one tenth of one per cent to two per cent based on the cellulose content. It has been determined that delustered viscose artificial silk thread can be produced closely simulating that of natural silk by incorporating in the viscose solution prior to spinning 1.2% of boron nitride based on the cellulose content.

It is to be understood that it is within the scope of my invention to include all variations in the application of boron nitride for delustering artificial silk and any other metallic nitride which is stable in acids and alkalies and otherwise suitable for this purpose. Moreover, my invention contemplates the use of boron nitride in combination or in conjunction with other delustering agents such as oily materials and particularly volatile oils of the type pine oil. My invention must be construed to be limited only as set forth in the appended claims.

The compound boron nitride referred to in the foregoing specification may be either one of the two nitrides of boron, BN or $BN_2$ that are known to exist, or a mixture of those two compounds. Preferably, however, the compound will be the more common of the nitrides which has the formula BN.

What I claim is:

1. A low-luster artificial silk filament containing therein finely divided and uniformly distributed particles of boron nitride and an oily material.

2. A low-luster artificial silk filament containing therein finely divided and uniformly distributed particles of boron nitride and pine oil.

3. A low-luster artificial silk filament containing therein finely divided and uniformly distributed particles of boron nitride.

4. A low-luster artificial silk filament containing therein finely divided and uniformly distributed particles of boron nitride existing in a range of from 0.1% to 2.0% based on the cellulose content.

5. A low-luster artificial silk filament containing therein 1.2% finely divided and uniformly distributed particles of boron nitride.

6. A low-luster viscose artificial silk filament containing therein finely divided and uniformly distributed particles of boron nitride existing in a range of from 0.1% to 2.0% based on the cellulose content.

ROBERT F. DAVIS.